US007669704B1

(12) United States Patent
Rayne

(10) Patent No.: US 7,669,704 B1
(45) Date of Patent: Mar. 2, 2010

(54) SECURED MONEY DROP BOX

(76) Inventor: Harley Rayne, 52213 SE. 496th Pl., Greenwater, WA (US) 98022

( * ) Notice: Subject to any disclaimer, the term of this patent is extended or adjusted under 35 U.S.C. 154(b) by 0 days.

(21) Appl. No.: 12/197,248

(22) Filed: Aug. 23, 2008

(51) Int. Cl.
*B65G 11/16* (2006.01)

(52) U.S. Cl. ........................... 193/33; 109/66; 232/43.1

(58) Field of Classification Search ................... 193/33, 193/34, 2 R; 453/16; 109/58, 58.5, 59 R, 109/66; 232/1 D, 1 E, 43.1, 43.3; 206/0.815, 206/0.82
See application file for complete search history.

(56) References Cited

U.S. PATENT DOCUMENTS 1,632,536 A * 6/1927 Breen .......................... 193/34
1,944,313 A * 1/1934 Brandt ....................... 193/2 R
2,020,176 A * 11/1935 Fleischer ................. 206/0.815
2,562,632 A * 7/1951 Mosman ...................... 109/66
4,084,520 A * 4/1978 Frier ........................... 109/56
4,463,873 A * 8/1984 Fukuyama et al. .......... 198/524
5,618,042 A * 4/1997 Takemoto et al. ...... 193/DIG. 1
7,210,681 B2 * 5/2007 Asako ........................... 193/8

* cited by examiner

*Primary Examiner*—James R Bidwell

(57) ABSTRACT

A device that holds money within a secure box which is constructed of a chute body of elongated shape having a sealed and an open end, the sealed end has a money drop aperture on a top surface while the open end body being sealed by a locked door, the chute body being fixedly installed in a wall with the sealed end exposed in an open-access space and the open and exposed in a restricted-access space; and a bottom wall of the chute body being sloped downwardly from the sealed end toward the open end by at least 30° to facilitate money dropped through money drop aperture to roll down the slope toward the open end of the chute body.

6 Claims, 5 Drawing Sheets

SECURED MONEY DROP BOX

FIELD OF THE INVENTION

The present invention generally relates money storage device and more particularly, relates to a secured money drop box that is particularly suitable for storing tip money in a commercial eating and drinking establishment.

BACKGROUND OF THE INVENTION

In a commercial eating and drinking establishment, such as restaurants, coffee shops, bars, and taverns, a tip jar is frequently used to store tip money received by the wait staff such that it can be distributed at the end of the day. The tip jar is presently a metal box that can be easily broken into or carried away such that the entire tip collecting can be lost resulting in substantial financial loss for the wait staff at the establishment.

It is therefore desirable to provide a tip collecting device that can be used to securely collect and store tip money at an establishment.

It is therefore an object of the present invention to provide a tip collection and storage device that does not have the drawbacks or shortcomings of the conventional tip jars.

It is another object of the present to provide a secured money drop box that can be used to store tip money safely without being lost or stolen.

SUMMARY OF THE INVENTION

In accordance with the present invention, a secured money drop box is provided for use in a drinking or eating establishment.

In a preferred embodiment the present invention secured money drop can be constructed of a chute body of elongated shape having a sealed end and an open end, the sealed end having a money drop aperture on a top surface while the open end being sealable by a locked door, the chute body being fixedly installed in a wall with the sealed end exposed in an open-access space and the open end exposed in a restricted-access space; and a bottom wall of the chute body being sloped downwardly from the sealed end toward the open end by at least 30° to facilitate money dropped through said money drop aperture to roll down the slope toward said open end of the chute body.

DETAILED DESCRIPTION OF THE PREFERRED EMBODIMENT

The present invention discloses a secured money drop box for use to store tip money at an eating or drinking establishment.

The present invention secured money drop box is a device that can hold tips within a secured box. The money drop box can be used in commercial eating and drinking establishments, such as restaurants, coffee shops, bars, and taverns.

The present invention secured money drop box features a locking access door/coffee cup that is placed on the outside counter. It would consist of a secure, locking vault for tips at coffee shops, ice cream parlors, expresso stands, bars, etc. The coffee mug would be attached to the present invention, secured money drop box from the outside. The secured money drop box would be attached through the wall.

When used, the present invention secured money drop box, tips would be dropped into the open-ended coffee mug. The coins or bills would drop downward into the chute and then into a locked box inside the coffee stand.

The present invention secured money drop box could contribute to a safer method of collecting tips and could reduce theft. The unit, measuring approximately 16 inches high, 18 inches long, and 9 inches wide, could be produced in a wide range of colors, shapes, styles, and designs.

The present invention secured money drop box would fulfill the need for a specially designed tip holder that could deter theft.

The appealing features of the secured money drop box would be its safety, effectiveness, convenience, novelty, eye-catching design, attractiveness, decorative and aesthetic appeal, durability, ease of use, and reasonable price. This newly designed tip holder would put an operator's mind at ease knowing that any tip would be safely deposited inside a vault. Tips would be more secure with the use of this present invention secured money drop box. The present invention, secured money drop box could effectively reduce theft and enhance security in any coffee shop, bar, expresso stand, etc. It would prevent tip jars from being stolen and would serve as a viable alternative to portable tip jars. This novel and decorative tip holder would be welcomed by employees of restaurants, bars, taverns, coffee shops, etc. Its eye-catching design could encourage patrons to contribute more money for a tip. This product would provide enhanced visual appeal that would be more stimulating and interesting than a traditional tip container. This device would be simple to use, secure, easy to install, effective, convenient, durable, and novel in design.

DETAILED DESCRIPTION OF THE PREFERRED EMBODIMENT

Figure 1:
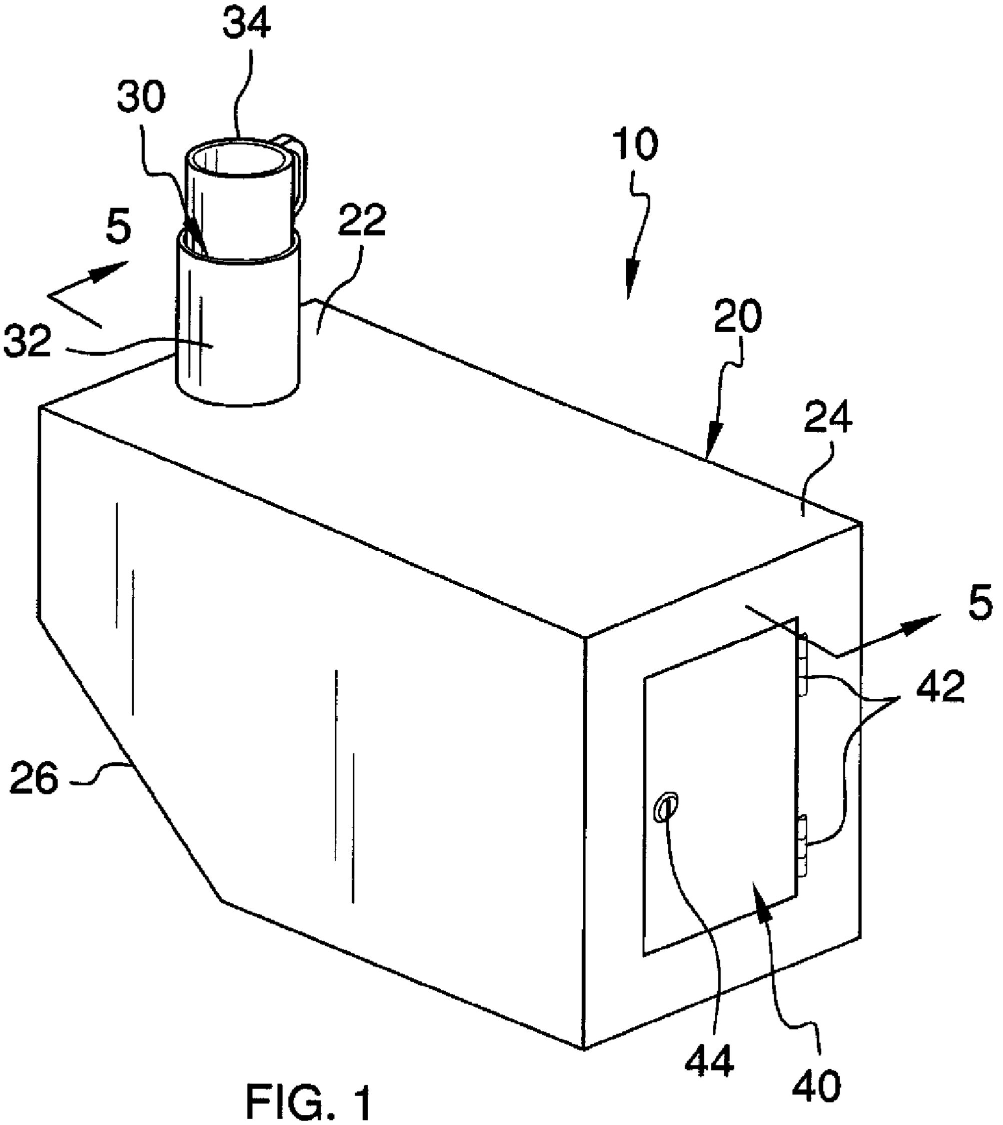
FIG. 1 is a perspective view of the present invention secured money drop box.

Referring initially to FIG. 1, wherein a perspective view of the present invention secured money drop box 10 is shown.

The box 10 is constructed of a chute body 20 of elongated shape that has a sealed end 22 and an opened end 24. The sealed end 22 has a money drop aperture 30 which may be suitably formed in any shape, such as a round hole or a straight slot. In the embodiment shown in FIG. 1, a round hole and a round conduit 32 is used wherein the round conduit 32 can be easily covered with a coffee cup 34. The round conduit 32 should have an opening or aperture 30 that is sufficiently small such that a human hand cannot go through in order to assure that money is not taken out or stolen. Also shown in FIG. 1, is a locked door 40 mounted on the open end 24, by hinges 42 and secured by a lock 44.

The chute body 20 has generally a rectangular cross-section wherein a bottom wall 26 is sloped downwardly from the sealed end 22 toward the open end 24 by at least 30° and preferably by at least 45° such that money dropped through the money drop aperture 30 rolls down the slope or fall down the slope toward the open end 24 of the chute body 20.

Figure 2:
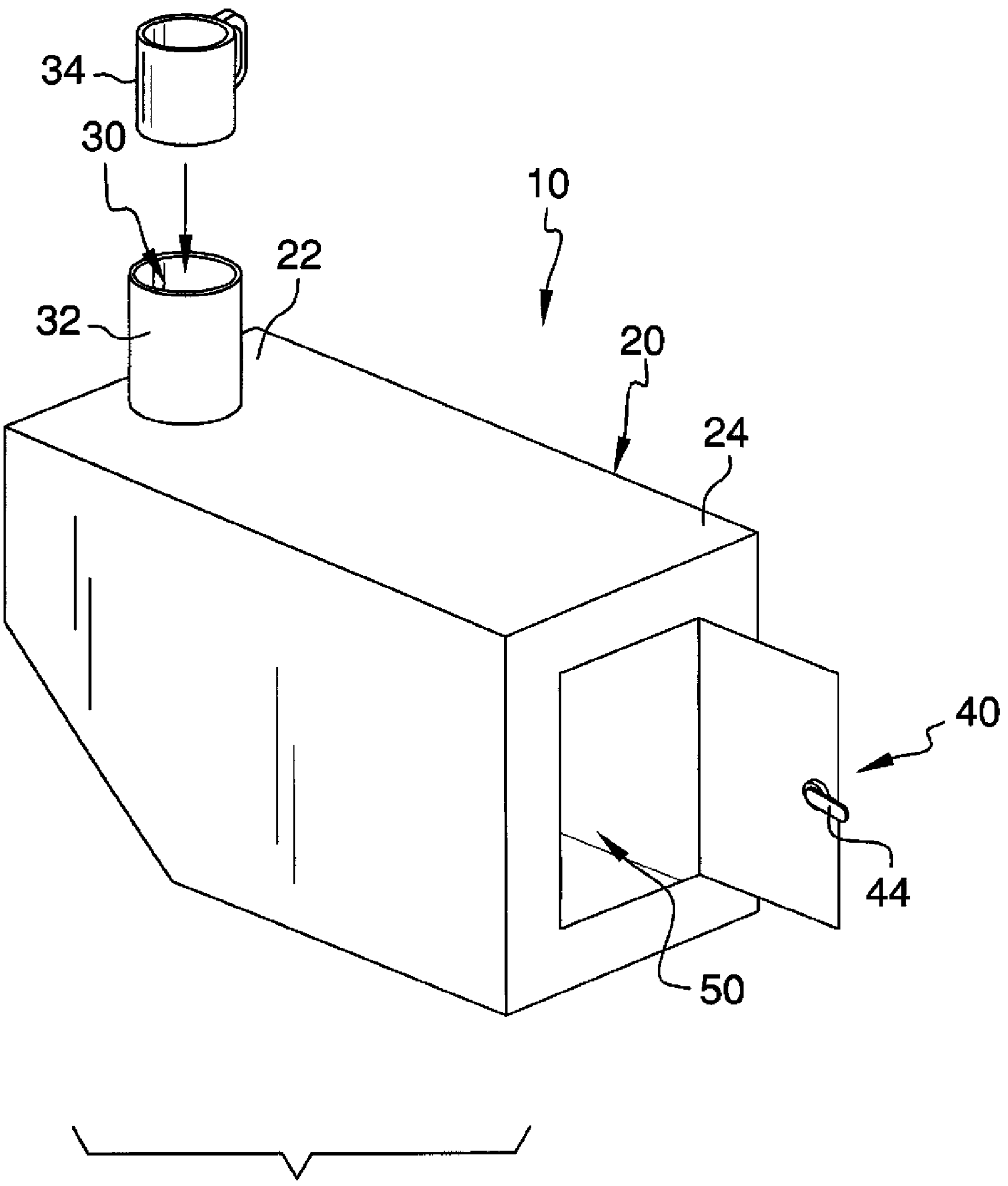
FIG. 2 is a perspective view of the present invention money drop box with the cover for the money drop aperture removed and the door opened.
Figure 3:
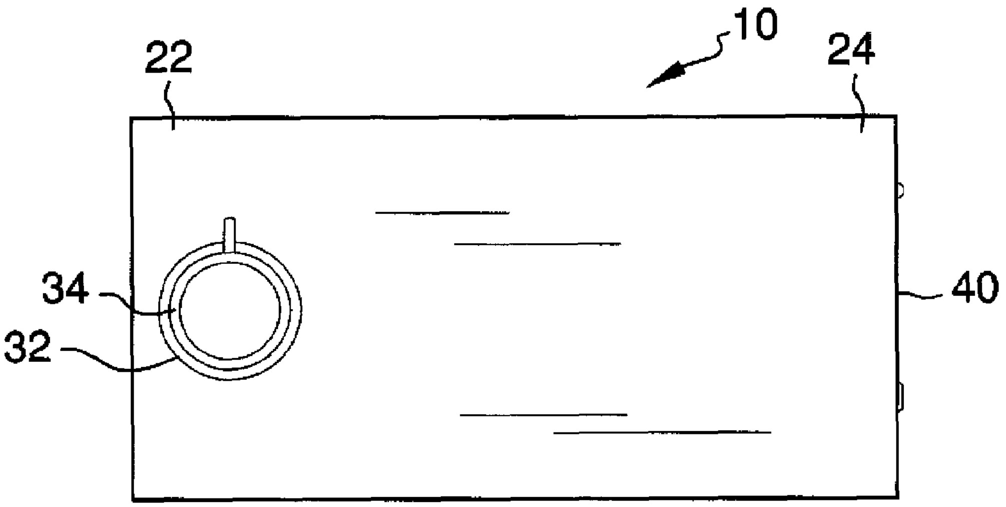
FIG. 3 is a top view of the present invention secured money drop box.

FIG. 2 is another perspective view of the present invention secured money drop box 10 with the door 40 in an unlocked position and the top 34 removed from the aperture 30. When the door 40 is in an opened position, money can be removed though the opening 50 as shown in FIG. 2.

Figure 4:
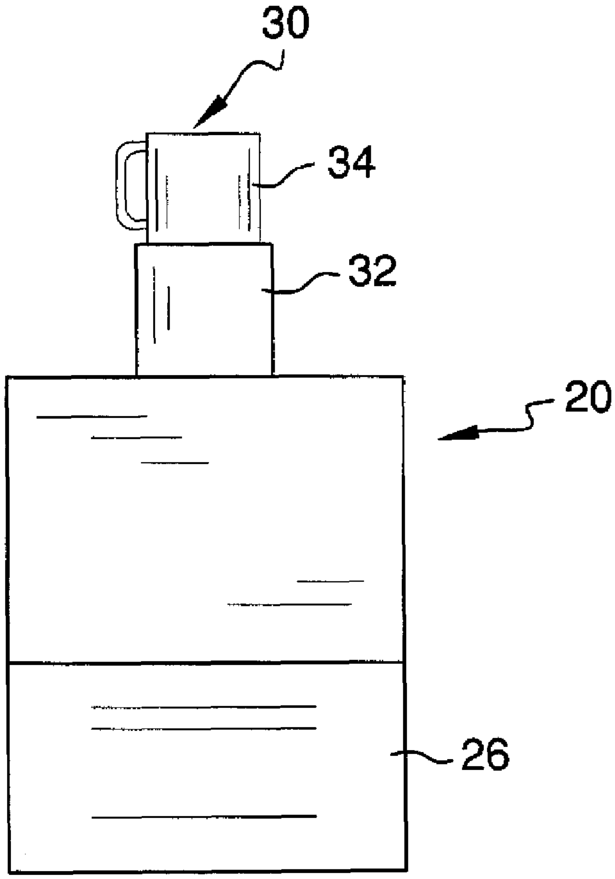
FIG. 4 is a rear view of the present invention money drop box.
Figure 5:
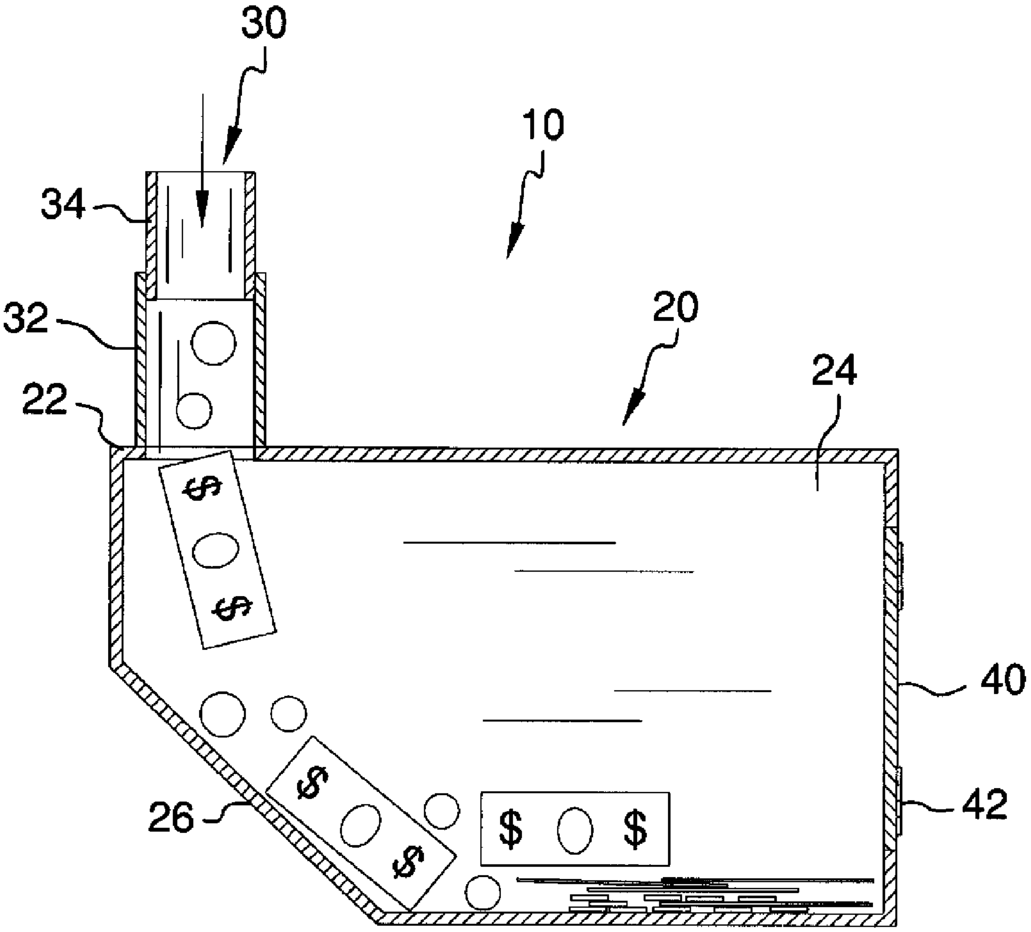
FIG. 5 is a cross-sectional view of the present invention money drop box.

A top view of the present invention money drop box 10 and an end view are shown respectively in FIGS. 4 and 5. A cross-sectional of the money drop 10 is further shown in FIG. 5 illustrating the downwardly sloped bottom wall 26 which allows money to roll down or fall down the slope into the deposited on or near the open end 24 of the chute's body 20.

Figure 6:
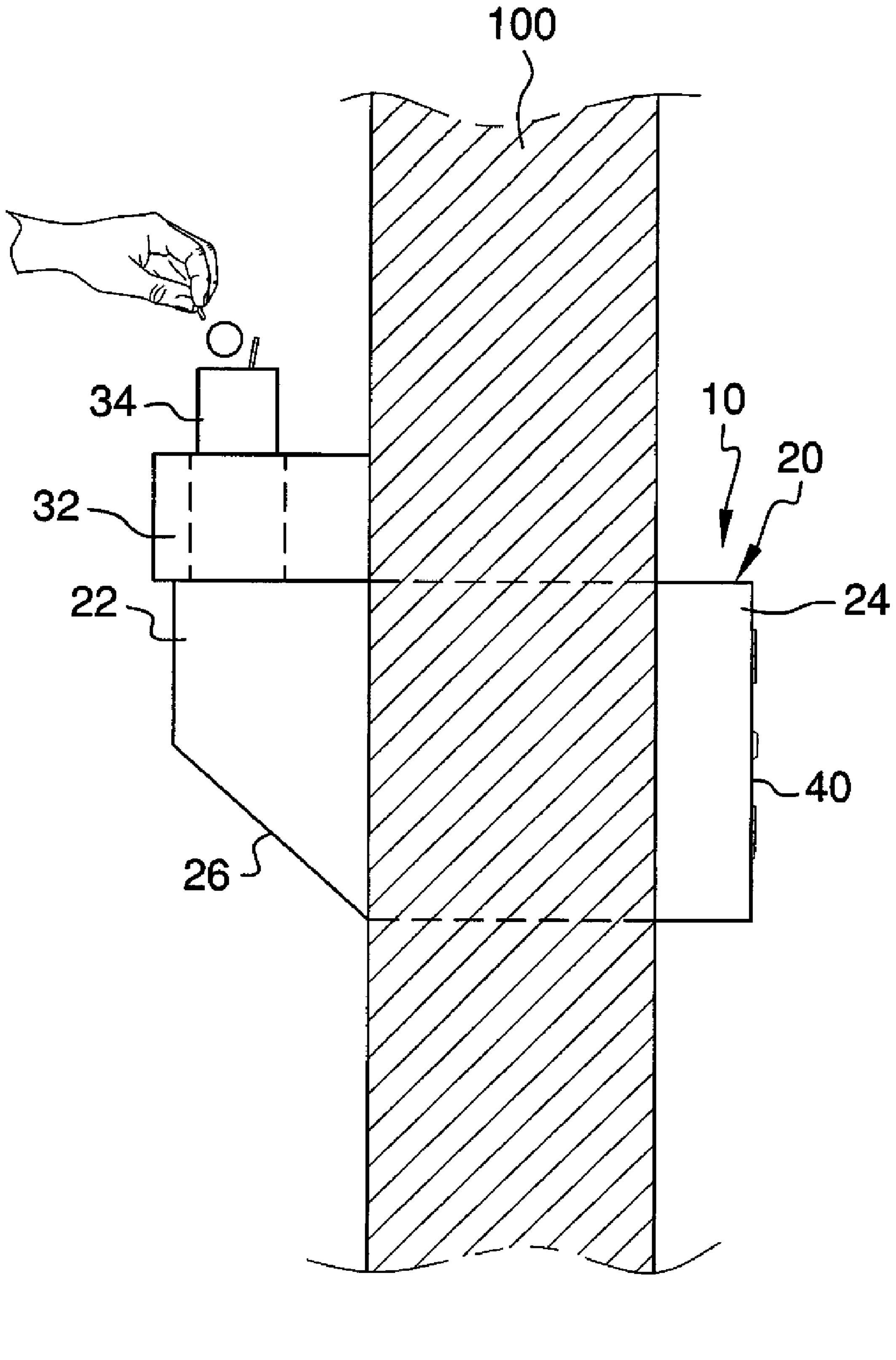
FIG. 6 is an illustration showing how the present invention money drop box is installed in a wall.

The present invention money drop box 10 can be installed, such as shown in FIG. 6, by locating a large part of the chute body 20 inside the wall 100. The mounting method may either be cement, or by other suitable mechanical means such as by screw or bolts which are known in the art and thus not shown in FIG. 6.

The chute body may be suitably formed by sheet metal, or by plastic as long as it can be securely mounted inside a wall.

The present invention secured money drop box has therefore been amply described in the above descriptions and in the appended drawings of FIGS. 1-6.

While the preferred embodiments of the invention have been described above, it will be recognized and understood that various modifications can be made in the invention and the appended claims are intended to cover all such modifications which may fall within the spirit and scope of the invention.

What is claimed is:

1. A secured money drop box comprising:

a chute body of elongated shape having a sealed end and an open end, said sealed end having a money drop aperture on a top surface while said open end being sealable by a locked door;

said chute body being fixedly installed in a wall with said sealed end exposed in an open-access space and said open end exposed in a restricted access space; and a bottom wall of said chute body being sloped downwardly from said sealed end toward said open end by at least 30° to facilitate money dropped through said money drop aperture to roll down the slope toward said open end of the chute body.

2. The secured money drop box according to claim 1 wherein said chute body is formed of sheet metal.

3. The secured money drop box according to claim 1, wherein said chute body is formed of plastic.

4. The secured money drop box according to claim 1, wherein said chute body has cross-sectional area of at least 5 inches by 5 inches.

5. The secure money box according to claim 1, wherein said bottom wall has a slope of at least 45°.

6. The secure money drop box according to claim 1, wherein said money drop aperture has a dimension sufficiently small so as not to allow a human hand to pass there through.

* * * * *